United States Patent
Okada et al.

(10) Patent No.: US 10,455,159 B2
(45) Date of Patent: Oct. 22, 2019

(54) IMAGING SETTING CHANGING APPARATUS, IMAGING SYSTEM, AND IMAGING SETTING CHANGING METHOD

(71) Applicant: KYOCERA Corporation, Kyoto (JP)

(72) Inventors: Takahiro Okada, Yokohama (JP); Takatoshi Nakata, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 313 days.

(21) Appl. No.: 15/039,617

(22) PCT Filed: Nov. 27, 2014

(86) PCT No.: PCT/JP2014/005949
§ 371 (c)(1),
(2) Date: May 26, 2016

(87) PCT Pub. No.: WO2015/079702
PCT Pub. Date: Jun. 4, 2015

(65) Prior Publication Data
US 2017/0171444 A1 Jun. 15, 2017

(30) Foreign Application Priority Data
Nov. 27, 2013 (JP) .................. 2013-245346

(51) Int. Cl.
*H04N 5/235* (2006.01)
*H04N 5/247* (2006.01)
(Continued)

(52) U.S. Cl.
CPC ....... *H04N 5/2351* (2013.01); *G06K 9/00791* (2013.01); *H04N 5/23238* (2013.01); *H04N 5/247* (2013.01); *H04N 7/18* (2013.01)

(58) Field of Classification Search
CPC ..................................................... B60R 1/00
See application file for complete search history.

(56) References Cited

U.S. PATENT DOCUMENTS 9,247,217 B2   1/2016 Okuyama
2002/0085219 A1*  7/2002 Ramamoorthy ........ G06T 15/10
                                                    358/1.9
(Continued)

FOREIGN PATENT DOCUMENTS

JP   2002-027448 A   1/2002
JP   2007-323587 A   12/2007
(Continued)

OTHER PUBLICATIONS

An Office Action issued by the Japanese Patent Office dated Aug. 1, 2017, which corresponds to Japanese Patent Application No. 2015-550570 and is related to U.S. Appl. No. 15/039,617, with English language Concise Explanation.

(Continued)

*Primary Examiner* — Clifford Hilaire
(74) *Attorney, Agent, or Firm* — Studebaker & Brackett PC (57) ABSTRACT

Provided are an imaging setting changing apparatus, an imaging system, and an imaging setting changing method that are capable of improving visibility of a combined image around a movable body. An imaging setting changing apparatus includes an image acquisition unit configured to acquire a plurality of images capturing around a movable body in a partially overlapping manner generated by a plurality of imaging units, and a controller configured to change imaging setting of at least one of two imaging units in such a manner as to reduce at least one of a brightness difference and a color difference of the overlapping area in the images taken by the two imaging units configured to commonly image the overlapping area.

6 Claims, 5 Drawing Sheets

(51) Int. Cl.
    *H04N 5/232*     (2006.01)
    *H04N 7/18*     (2006.01)
    *G06K 9/00*     (2006.01)

(56) References Cited

U.S. PATENT DOCUMENTS

| | | |
|---|---|---|
| 2007/0268118 A1 | 11/2007 | Watanabe et al. |
| 2007/0285282 A1 | 12/2007 | Nakayama et al. |
| 2010/0053364 A1* | 3/2010 | Mino ................ H04N 5/23212 348/222.1 |
| 2012/0026333 A1 | 2/2012 | Okuyama |
| 2012/0062745 A1* | 3/2012 | Han .................... B62D 15/029 348/148 |

FOREIGN PATENT DOCUMENTS

| | | |
|---|---|---|
| JP | 2007-329555 A | 12/2007 |
| JP | 2009-134517 A | 6/2009 |
| JP | 2010-154310 A | 7/2010 |
| JP | 2010-166196 A | 7/2010 |
| JP | 2011-030141 A | 2/2011 |

OTHER PUBLICATIONS

International Search Report issued in PCT/JP2014/005949; dated Feb. 24, 2015.
Written Opinion issued in PCT/JP2014/005949; dated Feb. 24, 2015; with English language Concise Explanation.
Extended European Search Report issued by the European Patent Office dated Jun. 14, 2017, which corresponds to EP14866311.5-1903 and is related to U.S. Appl. No. 15/039,617.

* cited by examiner

IMAGING SETTING CHANGING APPARATUS, IMAGING SYSTEM, AND IMAGING SETTING CHANGING METHOD

CROSS REFERENCE TO RELATED APPLICATION

This application claims priority to and the benefit of Japanese Patent Application No. 2013-245346 (filed on Nov. 27, 2013) and PCT Application No. PCT/JP2014/005949 (filed on Nov. 27, 2014), the entire contents of which are incorporated herein by reference.

TECHNICAL FIELD

The present invention relates to an imaging setting changing apparatus for changing an imaging setting of a camera, an imaging system, and an imaging setting changing method.

BACKGROUND ART

Conventionally, there has been known an around-view-monitor system for taking images around a movable body such as a vehicle with a plurality of on-vehicle cameras and displaying a combined image overlooking around the movable body by using a plurality of captured images. For the system, a technique to provide visual consecutiveness between joints of each captured images has been known (e.g., PLT 1).

CITATION LIST

Patent Literature

PLT 1: JP-A-2010-166196

SUMMARY

Technical Problem

In order to secure visibility of the image, adjustments of color and brightness of the image by, for example, gamma correction, white balance, and exposure control are popularly performed. However, since these adjustments are independently performed to each camera, the visibility of the combined image may be deteriorated. For example, at night or indoors, when the brightness and the color of each image differ from one another due to an influence of lights of the movable body or a nearby light source that partially illuminate around the movable body, consecutiveness of the brightness and the color is lost in the combined image. Accordingly, a suitable imaging setting capable of securing the visibility in each image does not necessarily correspond to appropriate imaging setting that may secure the visibility of the combined image. Therefore, the combined image may not always secure sufficient visibility.

Therefore, it could be helpful to provide an imaging setting changing apparatus, an imaging system, and an imaging setting changing method that are capable of improving the visibility of a combined image around the movable body.

Solution to Problem

An imaging setting changing apparatus of the disclosure herein includes:

an image acquisition unit configured to acquire a plurality of images capturing around a movable body in a partially overlapping manner generated by a plurality of imaging unit; and a controller configured to change imaging setting of at least one of two imaging units configured to commonly image an overlapping area in such a manner as to reduce at least one of a brightness difference and a color difference of images of the overlapping area taken by the two imaging units.

According to the imaging setting changing apparatus, preferably, the controller, when there are a plurality of overlapping areas in the plurality of images generated by the plurality of imaging units, determines a priority to change the imaging setting for each of the overlapping areas.

The imaging setting changing apparatus preferably further includes a control information acquisition unit configured to acquire control information of the movable body, wherein the controller determines the priority based on the control information.

According to the imaging setting changing apparatus, preferably, the control information includes at least one of time information, information on a traveling direction of the movable body, information on a steering angle of the movable body, information on an illumination state of the movable body, and information on a speed of the movable body.

According to the imaging setting changing apparatus, preferably, the image acquisition unit acquires information on a gain from each of the plurality of imaging units, and the controller, when a difference between gains of two imaging units according to the information is at a predetermined threshold or greater, carries out at least one of warning a driver and changing gain setting of at least one of the two imaging units in such a manner as to reduce the difference between the gains before changing the imaging setting.

An imaging system of the disclosure herein includes:

a plurality of imaging units configured to generate a plurality of images capturing around a movable body in a partially overlapping manner;

an image acquisition unit configured to acquire the plurality of images; and a controller configured to change imaging setting of at least one of two imaging units configured to commonly image an overlapping area in such a manner as to reduce at least one of a brightness difference and a color difference of images of the overlapping area taken by the two imaging units.

An imaging setting changing method of the disclosure herein is an imaging setting changing method carried out by an imaging setting changing apparatus, the method includes:

a step of acquiring a plurality of images capturing around a movable body in a partially overlapping manner generated by a plurality of imaging units; and a step of changing imaging setting of at least one of two imaging units configured to commonly image an overlapping area in such a manner as to reduce at least one of a brightness difference and a color difference of images of the overlapping area taken by the two imaging units.

Advantageous Effect

According to the imaging setting changing apparatus, the imaging system, and the imaging setting changing method of the disclosure herein, visibility of a combined image around the movable body may be improved.

DETAILED DESCRIPTION

Hereinafter, an embodiment of the disclosure herein will be described with reference to the accompanying drawings.

Figure 1:
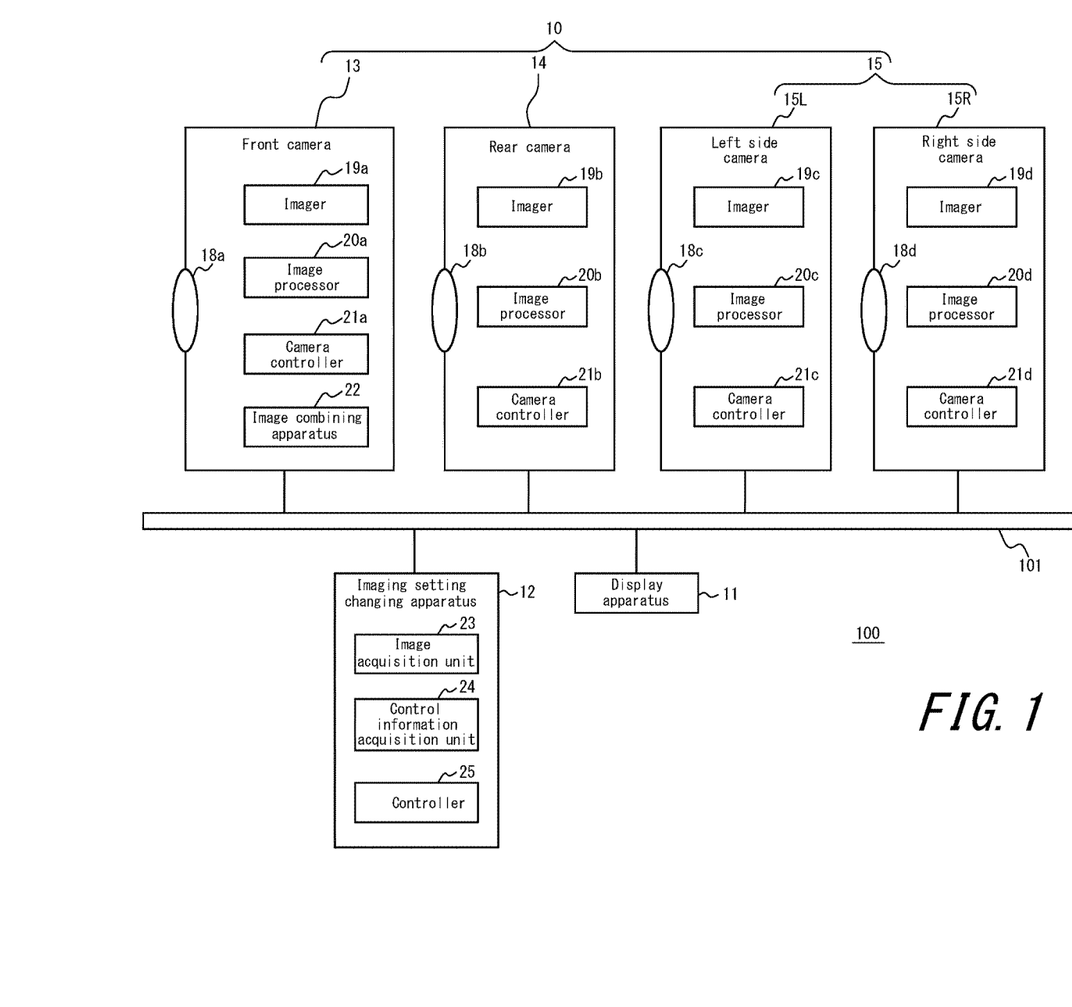
FIG. 1 is a functional block diagram illustrating a schematic configuration of an imaging system according to one embodiment of the disclosure herein.

First, an imaging setting changing apparatus and an imaging system according to one embodiment will be described. FIG. 1 is a functional block diagram illustrating a schematic configuration of the imaging system according to the embodiment.

As illustrated in FIG. 1, an imaging system 100 includes an imaging apparatus 10, a display apparatus 11, and an imaging setting changing apparatus 12. The imaging apparatus 10 according to the present embodiment includes a plurality of imaging units: for example, a front camera 13, a rear camera 14, and side cameras 15 (a left-side camera 15L and a right-side camera 15R).

Figure 2:
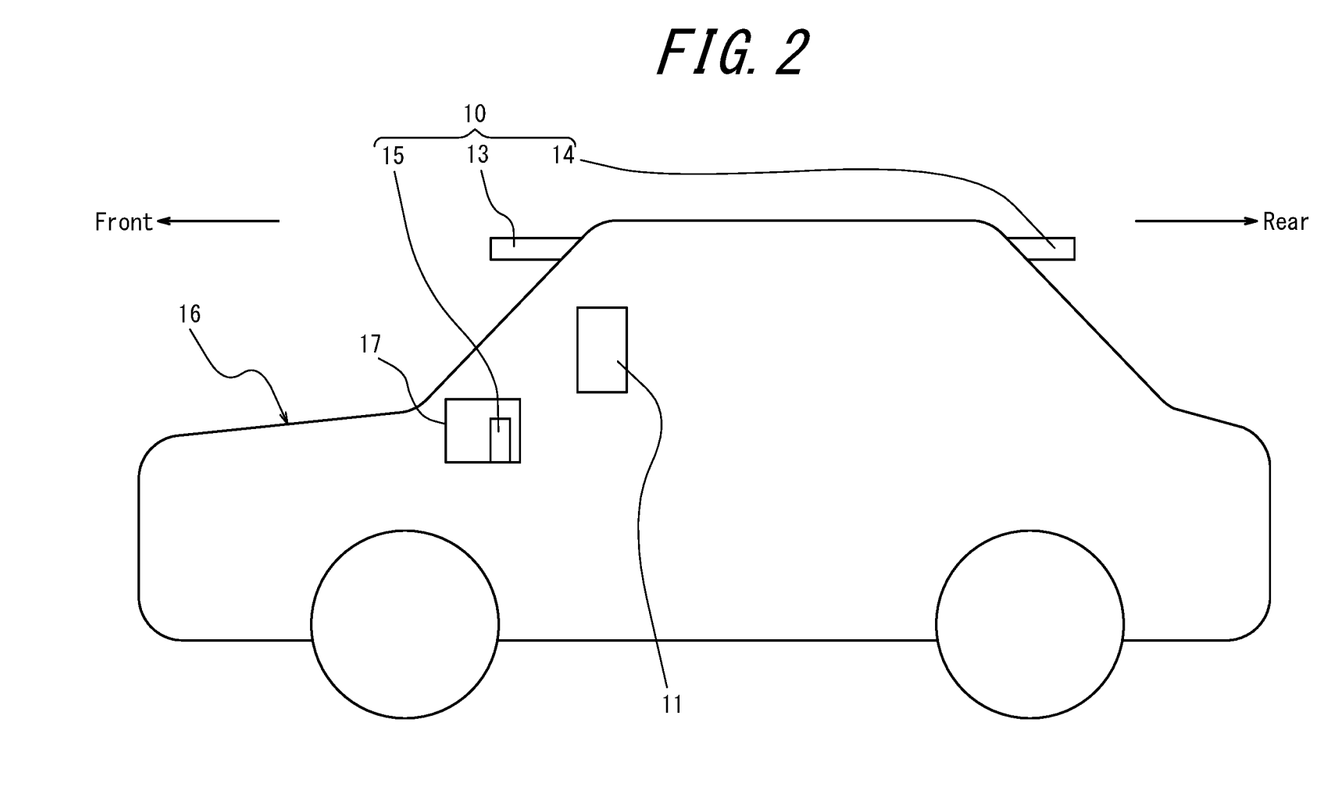
FIG. 2 is a schematic diagram illustrating arrangements of components of the imaging system of FIG. 1.

As illustrated in FIG. 2, the display apparatus 11 is disposed at a position visible from a driver's seat. The front camera 13 is disposed to be able to image an area in front of a movable body 16. The rear camera 14 is disposed to be able to image an area behind the movable body 16. The side cameras 15L and 15R are respectively disposed at, for example, door mirrors 17 facing vertically downward in such a manner as to be able to capture respective sides from the movable body 16. Also, the side cameras 15L and 15R are disposed on a left-side and a right-side of the movable body 16, respectively, in a symmetrical manner.

Figure 3:
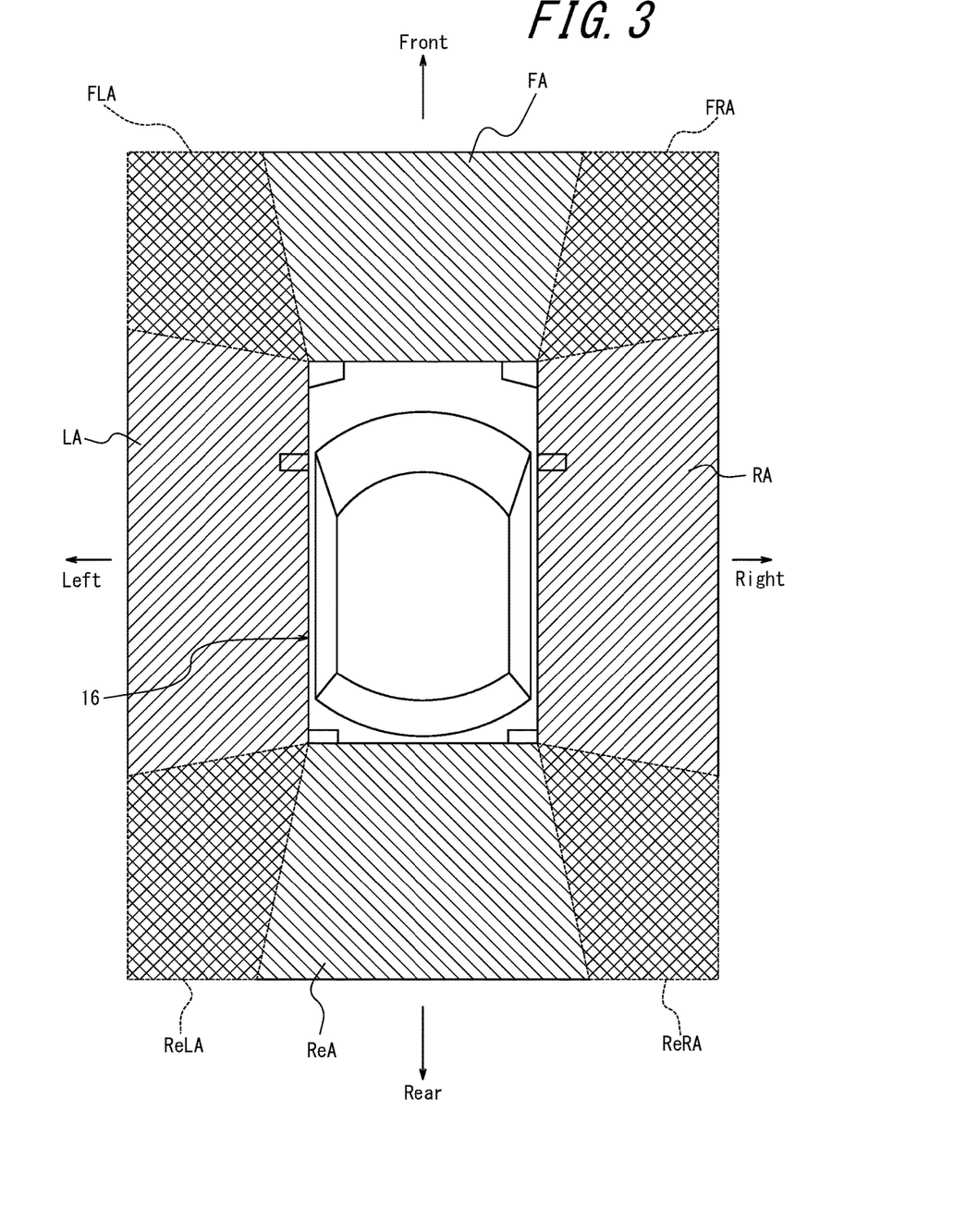
FIG. 3 is a schematic diagram illustrating an imaging range of the imaging apparatus of FIG. 1.

The front camera 13, the rear camera 14, and the side cameras 15L and 15R respectively include wide angle lenses such as, for example, fish-eye lenses and thus are capable of capturing around the movable body 16 in a wide angle. As illustrated in FIG. 3, a capturing range of the front camera 13 includes a front area FA of the movable body 16. A capturing range of the rear camera 14 includes a rear area ReA of the movable body 16. Capturing ranges of the left-side camera 15L and the right-side camera 15R include a left-side area LA and a right-side area RA of the movable body 16, respectively.

The capturing ranges of the imaging units 13, 14, 15L, and 15R partially overlap around the movable body 16, e.g., at four corners thereof. More specifically, the capturing range of the front camera 13 and the capturing ranges of the side cameras 15 (15L and 15R) include a left-side front area FLA and a right-side front area FRA of the movable body 16 in an overlapping manner. Also, the capturing range of the rear camera 14 and the capturing ranges of the side cameras 15L and 15R include a left-side rear area ReLA and a right-side rear area ReRA in the overlapping manner. Hereinafter, the capturing ranges around the movable body 16 captured by the imaging units 13, 14, 15L, and 15R in the overlapping manner are referred to as overlapping ranges (the FLA, the FRA, the ReLA, and the ReRA).

Next, a configuration of the imaging units (the front camera 13, the rear camera 14, and the side cameras 15) will be described. The front camera 13 (see FIG. 1) includes an optical system 18a, an imager 19a, an image processing unit 20a, a camera controller 21a, and an image combining apparatus 22.

The optical system 18a includes a diaphragm and a plurality of lenses and forms a subject image. According to the present embodiment, the optical system 18a has a wide angle and is capable of forming the subject image around the movable body 16 as described above.

The imager 19a is, for example, an image sensor such as CMOS and captures the subject image formed by the optical system 18a. Also, the imager 19a generates an image signal by capturing the image and outputs the image signal to the image processing unit 20a.

The image processing unit 20a, on the captured image generated by the imager 19a, performs normal image processing such as noise removal, color interpolation, brightness correction, and color correction. For example, the image processing unit 20a adjusts the brightness and the color of the image by performing gain control, gamma correction, and white balance.

Also, the image processing unit 20a performs image conversion processing for converting a wide-angle captured image generated by the imager 19a into an overhead image. That is, through the image conversion, the image generated by capturing a wide angle and generally distorted in a peripheral portion is converted into the overhead image viewing around the movable body 16 in a vertically downward direction from upward thereof. More specifically, the image processing unit 20a converts the image captured by the imager 19a into the overhead image of the front area FA and the overlapping areas FLA and FRA (see FIG. 3) of the movable body 16.

Further, the image processing unit 20a, via an in-vehicle network 101 (see FIG. 1) or a dedicated line, outputs the image subjected to the image processing as the image signal to the image combining apparatus 22 and the imaging setting changing apparatus 12.

The camera controller 21a controls an operation of each unit of the front camera 13. For example, the camera controller 21a controls the imager 19a to capture an image around the movable body 16 in synchronization with the rear camera 14 and the side cameras 15L and 15R and to generate images periodically, e.g., 30 fps.

Also, the camera controller 21a, based on predetermined imaging setting, controls operations of the optical system 18a and the image processing unit 20a. The imaging setting includes information related to the brightness and the color of the captured image. The information related to the brightness and the color of the captured image may be, for example, information on setting of an aperture of the optical system 18a and a shutter speed by exposure control, and information on the gain to be multiplied by the image signal during the gain control, the gamma correction, and the white balance.

Also, the camera controller 21a exchanges information via the in-vehicle network 101 or a dedicated line.

The image combining apparatus 22 combines the images output by the image processing units 20a, 20b, 20c, and 20d of the front camera 13, the rear camera 14, the side camera 15L, and the side camera 15R, respectively, and thereby generates a combined image. The combined image is, for example, an overhead image of the entire periphery of the movable body 16. In the overhead image of the entire periphery according to the present embodiment, the front area FA of the movable body 16 and the overlapping areas FLA and FRA employ the image taken by the front camera 13, and the rear area ReA and the overlapping areas ReLA and ReRA employ the image taken by the rear camera 14. Also, the left-side area LA and the right-side area RA employ the image taken by the left-side camera 15L and the image taken by the right-side camera 15R, respectively (see FIG. 3). Also, the image combining apparatus 22, via the in-vehicle network 101 or a dedicated line, outputs the combined image to the display apparatus 11.

The rear camera 14 and the side cameras 15L and 15R (see FIG. 1), similarly to the front camera 13, include optical systems 18b, 18c, and 18d, imagers 19b, 19c, and 19d, image processing units 20b, 20c, and 20d, and camera controllers 21b, 21c, and 21d, respectively. Functions and configurations of the optical systems 18b, 18c, and 18d, the imagers 19b, 19c, and 19d, the image processing units 20b, 20c, and 20d, and the camera controllers 21b, 21c, and 21d are similar to the optical system 18a, the imager 19a, the image processing unit 20a, and the camera controller 21a of the front camera 13, respectively.

For example, the image processing unit 20b of the rear camera 14 performs the normal image processing on the image taken by the imager 19b of the rear camera 14 and converts a processed image thus obtained into an overhead image of the rear area ReA and the overlapping areas ReLA and ReRA (see FIG. 3). Also, the image processing unit 20c of the left-side camera 15L performs the normal image processing on the image taken by the imager 19c of the left-side camera 15L and converts a processed image thus obtained into an overhead image of the left-side area LA and the overlapping areas FLA and ReLA. Further, the image processing unit 20d of the right-side camera 15R performs the normal image processing on the image taken by the imager 19d of the right-side camera 15R and converts a processed image thus obtained into the overhead image of the right-side area RA and the overlapping areas FRA and ReRA.

The display apparatus 11 (see FIG. 1) includes, for example, an LCD and is capable of displaying real-time video images. The display apparatus 11 acquires and displays the combined image output by the image combining apparatus 22. The display apparatus 11 may be a touch panel and function as an interface for receiving a user operation. Also, the display apparatus 11 may exchange information via the in-vehicle network 101 or a dedicated line.

The imaging setting changing apparatus 12 includes an image acquisition unit 23, a control information acquisition unit 24, and a controller 25.

The image acquisition unit 23 acquires image signals of the images generated by the imaging units 13, 14, 15L, and 15R. The image signal includes a luminance signal and a chrominance signal. Although in the present embodiment the image acquisition unit 23 acquires the overhead images generated by the image processing units 20a, 20b, 20c, and 20d of the imaging units 13, 14, 15L, and 15R, the image acquisition unit 23 may acquire images undergone the normal image processing by the image processing units 20a, 20b, 20c, and 20d, or the images generated by the imagers 19a, 19b, 19c, and 19d. Or, the image acquisition unit 23 may acquire the image signals of the overlapping areas FLA, FRA, ReLA, and ReRA alone of each image.

The control information acquisition unit 24 acquires control information of the movable body 16. In the present embodiment, the control information includes time information and various information on a state of the movable body 16. The various information on the state of the movable body 16 includes, for example, information on a traveling direction (forward or backward) of the movable body 16, information on a steering angle, information on illumination states (for example, headlights, taillights, and brake lights), and information on a speed of the movable body 16. The control information acquisition unit 24 may acquire the control information in any method; for example, the control information acquisition unit 24 may acquire the control information from the movable body 16 via the in-vehicle network 101 or acquire, in a wired/wireless manner, the control information output by other components such as various sensors mounted on the movable body 16.

The controller 25 controls an operation of each unit of the imaging setting changing apparatus 12. For example, the controller 25 controls the control information acquisition unit 24 to acquire the control information of the movable body 16 simultaneously with the imaging by the imagers 19a, 19b, 19c, and 19d of the imaging units 13, 14, 15L, and 15R. Also, the controller 25 controls the image acquisition unit 23 and the control information acquisition unit 24 to periodically acquire the images and the control information.

Also, the controller 25 changes the imaging setting of at least one of two imaging units (13, 14, 15L, and 15R) in such a manner as to reduce at least one of a brightness difference and a color difference of the images of the overlapping areas (FLA, FRA, ReLA, and ReRA) in images taken by the two imaging units (13, 14, 15L, and 15R) and acquired therefrom. In other words, the controller 25 changes the imaging setting of at least one of the two imaging units (13, 14, 15L, and 15R) in such a manner as to match (to substantially coincide) the brightness and the color of the two images of the overlapping areas (FLA, FRA, ReLA, and ReRA).

For example, the controller 25, for each of the images taken by the front camera 13 and the left-side camera 15L that commonly image the overlapping area FLA (see FIG. 3), calculates a mean value of luminance signal components. Then, the controller 25, when a difference between the mean values of the luminance signal components of the two images is at a predetermined threshold or greater, i.e. when these images have a large difference in the mean brightness, changes the imaging setting of at least one of the front camera 13 and the left-side camera 15L in such a manner as to reduce the brightness difference. For example, the controller 25, when the image taken by the left-side camera 15L is bright, changes the setting of the left-side camera 15L such as the aperture, the shutter speed, and the gain to be multiplied by the image signal in such a manner as to reduce the brightness of the image taken by the left-side camera 15L. Further/Alternatively, the controller 25 changes the setting of the front camera 13 such as the aperture, the shutter speed, and the gain to be multiplied by the image signal in such a manner as to increase the brightness of the image taken by the front camera 13. Preferably, the controller 25, in such a manner as to match the mean values of the luminance signal components of the two images, i.e., in such a manner as to match the brightness of the overlapping area FLA in the images taken by the front camera 13 and the left-side camera 15L, changes the imaging setting of at least one of the front camera 13 and the left-side camera 15L. Similarly, the controller 25, by using chrominance signal components of the images, changes the imaging setting of at least one of the front camera 13 and the left-side camera 15L in such a manner as to reduce the color difference between the images.

Also, for example, the controller 25, for the image taken by the front camera 13, the image taken by the left-side camera 15L for imaging the overlapping area FLA together with the front camera 13, and the image taken by the right-side camera 15R for imaging the overlapping area FLA together with the front camera 13, calculates the respective mean values of the luminance signal components of the images of the overlapping areas (FLA and FRA) in the images.

Subsequently, the controller 25 calculates a mean value A of the mean value of the luminance signal components of the image taken by the left-side camera 15L and the mean value of the luminance signal components of the image taken by the right-side camera 15R. Also, the controller 25 calculates a mean value B of the mean value of the luminance signal components of the overlapping area FLA and the mean value of the luminance signal components of the overlapping area FRA.

Then, when a difference between the mean value A and the mean value B is at a predetermined threshold or greater, the controller 25 changes the imaging setting of the front camera 13 in such a manner as to reduce a difference between the brightness of the image taken by the front camera 13 and the mean brightness of the images taken by the side cameras 15L and 15R. For example, the controller 25, when the image taken by the front camera 13 is bright, changes the setting of the front camera 13 such as the aperture, the shutter speed, and the gain to be multiplied by the image signal in such a manner as to reduce the brightness of the image taken by the front camera 13. Preferably, the controller 25 changes the imaging setting of the front camera 13 in such a manner as to match the mean value B to the mean value A, i.e., to match the brightness of the image taken by the front camera 13 to the mean brightness of the images taken by the side cameras 15L and 15R. Similarly, the controller 25, by using the chrominance signal components of the image, changes the imaging setting of the front camera 13 in such a manner as to reduce the difference between the color of the image taken by the front camera 13 and the mean color of the images taken by the side cameras 15L and 15R.

Also, the controller 25, based on the control information acquired by the control information acquisition unit 24, determines priorities for performing the above operations to change the imaging setting of the imaging units 13, 14, 15L, and 15R for the overlapping areas FLA, FRA, ReLA, and ReRA. Then, the controller 25, according to the priorities of the FLA, FRA, ReLA, and ReRA, performs the above operations to the two images commonly capturing the overlapping areas FLA, FRA, ReLA, and ReRA, and sequentially changes the imaging setting of the imaging units 13, 14, 15L, and 15R.

For example, the controller 25, when the control information includes information indicative of that the traveling direction is backward, determines that the movable body 16 is moving backward. In this case, the controller 25 determines priority values of the overlapping areas ReLA and ReRA as "1" and a priority value of the overlapping area FLA as "2". When the priorities are determined in this manner, first, a changing operation of the imaging setting is carried out to the rear camera 14 for imaging the overlapping areas ReLA and ReRA and the side cameras 15 L and 15R. Next, the changing operation of the imaging setting is carried out to the front camera 13 for imaging the overlapping area FLA.

When the movable body 16 moves backward, a driver of the movable body 16 is believed to pay attention on the area behind the movable body 16 in the combined image, i.e., the image taken by the rear camera 14. When determining the priorities as described above, the controller 25 changes the imaging setting of the side cameras 15L and 15R in such a manner as to match the brightness and the color of the images taken by the side cameras 15L and 15R to those of the image taken by the rear camera 14. Subsequently, the controller 25 changes the imaging setting of the front camera 13 in such a manner as to match the brightness and the color of the image taken by the front camera 13 to those of the image taken by the left-side camera 15L. In this way, an adjustment is performed such that the brightness and the color of the image taken by the rear camera 14, which is closely observed by the driver, and the brightness and the color of the images taken by the side cameras 15L and 15R and the front camera 13 are recognized as equal.

Also, for example, the controller 25, when the control information includes information indicative of that the traveling direction is forward, determines that the movable body 16 is moving forward. In this case, the controller 25 determines the priority values of the overlapping areas FLA and FRA as "1" and the priority value of the overlapping area ReLA as "2". When the priorities are determined in this manner, first, the changing operation of the imaging setting is carried out to the front camera 13 and the side cameras 15L and 15R for imaging the overlapping areas FLA and FRA. Next, the changing operation of the imaging setting is carried out to the rear camera 14 for imaging the overlapping area ReLA.

When the movable body 16 moves forward, the driver of the movable body 16 is believed to pay attention on the area in front of the movable body 16 in the combined image, i.e., the image taken by the front camera 13. When determining the priorities as described above, the controller 25 changes the imaging setting of the side cameras 15L and 15R in such a manner as to match the brightness and the color of the images taken by the side cameras 15L and 15R to those of the image taken by the front camera 13. Subsequently, the controller 25 changes the imaging setting of the rear camera 14 in such a manner as to match the brightness and the color of the image taken by the rear camera 14 to those of the image taken by the left-side camera 15L. In this way, an adjustment is performed such that the brightness and the color of the image taken by the front camera 13, which is closely observed by the driver, and the brightness and the color of the images taken by the side cameras 15L and 15R and the rear camera 14 are recognized as equal.

Also, for example, when the control information includes information indicative of that the traveling direction is backward, the steering angle is at a predetermined angle on the left side of a steering angle neutral point, and the speed is slow, the controller 25 determines that the movable body 16 is parking on a rear left-side. In this case, the controller 25 determines the priority value of the overlapping area ReLA as "1", the priority value of the overlapping area ReRA as "2", and the priority value of the overlapping area FLA as "3". When the priorities are determined in this manner, first, the changing operation of the imaging setting is carried out to at least one of the rear camera 14 and the left-side camera 15L that image the overlapping area ReLA.

Next, the changing operation of the imaging setting is carried out to the front camera 13 for imaging the overlapping area FLA.

When the movable body 16 parks on the rear left-side, the driver of the movable body 16 is believed to pay attention on the rear left-side of the movable body 16 in the combined image, i.e., the image of the overlapping area ReLA taken by the rear camera 14 and the left-side camera 15L. When determining the priorities as described above, the controller 25 changes the imaging setting of at least one of the rear camera 14 and the left-side camera 15L in such a manner as to match the brightness and the color of the image taken by the rear camera 14 and those of the image taken by the left-side camera 15L. Subsequently, the controller 25 changes the imaging setting of the rear right-side camera 15R in such a manner as to match the brightness and the color of the image taken by the right-side camera 15R to those of the image taken by the rear camera 14. Then, the controller 25 changes the imaging setting of the front camera 13 in such a manner as to match the brightness and the color of the image taken by the front camera 13 to those of the image taken by the left-side camera 15L. In this way, an adjustment is performed such that the brightness and the color of the images taken by the rear camera 14 and the left-side camera 15L, which are closely observed by the driver, and the brightness and the color of the images taken by the front camera 13 and the right-side camera 15R are recognized as equal.

Also, for example, when the control information includes information indicative of that the traveling direction is forward, the time is between 5 pm and 7 am, and the lights (headlights) of the movable body 16 are turned on, the controller 25 determines that the movable body 16 is traveling forward with the headlights on at night. In this case, the controller 25 determines the priority values of the overlapping areas FLA and FRA as "1" and the priority values of the overlapping areas ReLA and ReRA as "2". When the priorities are determined in this manner, first, the changing operation of the imaging setting is carried out to the front camera 13 and the side cameras 15L and 15R that image the overlapping areas FLA and FRA. Next, the changing operation of the imaging setting is carried out to the rear camera 14 for imaging the overlapping areas ReLA and ReRA.

When the headlights are ON at night, the front camera 13 performs photometry in an illumination range of the headlights. Therefore, the subject image in the overlapping areas FLA and FRA that are not illuminated by the headlights becomes dark in the image taken by the front camera 13 and less visible. On the other hand, the side cameras 15L and 15R perform the photometry outside the illumination range of the headlights. Therefore, the subject image in the overlapping areas FLA and FRA becomes bright in the images taken by the side cameras 15L and 15R. When determining the priorities as described above, the controller 25 changes the imaging setting of the front camera 13 in such a manner as to match the brightness and the color of the image taken by the front camera 13 to mean brightness and mean color of the images taken by the side cameras 15L and 15R. Also, the controller 25 changes the imaging setting of the rear camera 14 in such a manner as to match the brightness and the color of the image taken by the rear camera 14 to the mean brightness and the mean color of the images taken by the side cameras 15L and 15R. In this way, an adjustment is performed such that the mean brightness and the mean color of the images taken by the side cameras 15L and 15R and the brightness and the color of the images taken by the front camera 13 and the rear camera 14 are recognized as equal.

Figure 4:
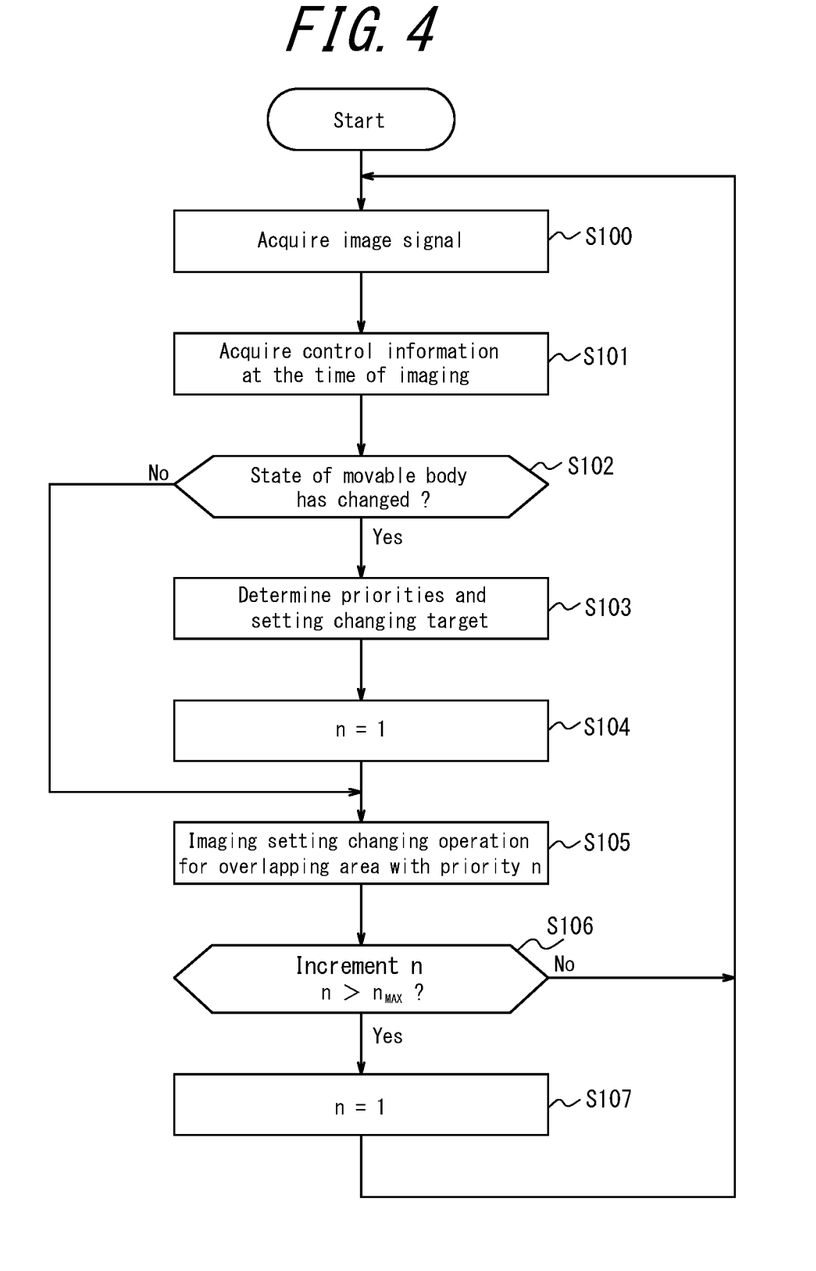
FIG. 4 is a flowchart illustrating an operation of an imaging setting changing apparatus of FIG. 1.

Next, an operation carried out by the imaging setting changing apparatus 12 according to the present embodiment will be described with reference to a flowchart in FIG. 4. This operation, for example, starts at the time of startup of the imaging apparatus 10 and is carried out iteratively until a user's termination instruction.

First, in step S100, the controller 25 controls the image acquisition unit 23 to acquire the captured images as the image signals from the imaging units 13, 14, 15L, and 15R.

Subsequently, in step S101, the controller 25 controls the control information acquisition unit 24 to acquire the control information of the movable body 16 at the time of imaging the captured images at step S100.

Subsequently, in step S102, the controller 25, based on the control information acquired at step S101, determines the state of the movable body 16 and determines that the state of the movable body 16 has changed. Here, the controller 25, when carrying out the processing at step S102 for the first time, determines that the state of the movable body 16 has changed. When the controller 25 determines that the state of the movable body 16 has changed (Yes at step S102), the controller 25 proceeds to step S103. On the other hand, when the controller 25 determines that the state of the movable body 16 has not changed (No at step S102), the controller 25 proceeds to step S105.

When the controller 25 determines that the state of the movable body 16 has changed at step S102 (Yes at step S102), in step S103, the controller 25 determines the priorities of the overlapping areas based on the state of the movable body 16 determined at step S102.

Subsequently, in step S104, the controller 25 sets a value of a variable n to 1.

After step S104, or when at step S102 the controller 25 determines that the state of the movable body 16 has not changed (No at step S102), in step S105, the controller 25, based on the priorities determined at step S103, carries out the changing operation of the imaging setting to the imaging units 13, 14, 15L, and 15R. More specifically, the controller 25 changes the imaging setting of the imaging units (13, 14, 15L, and 15R) in such a manner as to reduce the brightness difference and the color difference in the overlapping areas (FLA, FRA, ReLA, and ReRA) in the images taken by two imaging units (13, 14, 15L, and 15L) for commonly imaging the overlapping areas (FLA, FRA, ReLA, and ReRA) with the priority value n.

Subsequently, in step S106, the controller 25 increments the variable n and determines whether the n is larger than $n_{MAX}$. The $n_{MAX}$ is the largest value of the priorities determined at step S103. When the n is larger than the $n_{MAX}$ (Yes at step S106), the controller 25 proceeds to step S107. On the other hand, when the n is equal to or smaller than the $n_{MAX}$ (No at step S106), the controller 25 returns to step S100.

When the n is larger than the $n_{MAX}$ at step S106 (Yes at step S106), in step S107, the controller 25 sets the value of the variable n to 1 and returns to step S100 to continue the operation.

According to the imaging setting changing apparatus 12 of the present embodiment, as described above, at least one of the brightness difference and the color difference of the images taken by the two imaging units (13, 14, 15L, and 15R) for commonly imaging the overlapping area is reduced. Therefore, the adjustment is performed such that the brightness and the color of both images are recognized as equal, thereby improving the visibility of the combined image.

According to the imaging setting changing apparatus 12 of the present embodiment, also, when a plurality of images generated by a plurality of imaging units 13, 14, 15L, and 15R include a plurality of overlapping areas, the imaging setting of the imaging units 13, 14, 15L, and 15R are changed in an order according to the priorities determined for each of the overlapping areas. In this way, at least one of the brightness difference and the color difference of three or more images is reduced. Therefore, the adjustment is performed such that the brightness and the color of three or more images are recognized as equal, thereby improving the visibility of the combined image.

According to the imaging setting changing apparatus 12 of the present embodiment, further, the priorities are determined based on the control information of the movable body 16. As described below, therefore, the visibility of the combined image may be improved adapting various states of the movable body 16.

When the priorities are determined for the respective overlapping areas and the imaging setting of the imaging units 13, 14, 15L, and 15R are changed accordingly, in the combined image showing the overhead image of the entire periphery of the movable body 16, the brightness and the color at a border may become discontinuous. For example, a border that may be generated when the priorities of the overlapping areas FLA, FRA, and ReRA are determined as 1, 2, and 3, respectively, will be described. In this case, first, the brightness and the color of the image taken by the front camera 13 is adjusted in such a manner as to match to those of the image taken by the left-side camera 15L, and then the brightness and the color of the image taken by the right-side camera 15R are adjusted in such a manner as to match to those of the image taken by the front camera 13. Lastly, the brightness and the color of the image taken by the rear camera 14 are adjusted in such a manner as to match to those of the image taken by the right-side camera 15R. At this time, the brightness and the color of the images taken by the left-side camera 15L and the rear camera 14 do not necessarily become equal to one another but may become discontinuous at the border of these images.

Here, depending on a variety of states of the movable body 16, an area in the combined image on which the driver pays attention becomes different. For example, when the movable body 16 is moving backward, the driver is believed to pay more attention on the area behind the movable body 16 in the combined image and to pay less attention on the area in front of the movable body 16. The imaging setting changing apparatus 12 according to the present embodiment determines when, for example, the movable body 16 is moving backward, the priorities of the overlapping areas ReLA and ReRA as 1 and the priority of the overlapping area FLA as 2. In this case, the brightness and the color of the image taken by the side cameras 15L and 15R are adjusted in such a manner as to match to those of the image taken by the rear camera 14, and the brightness and the color of the image taken by the front camera 13 are adjusted in such a manner as to match to those of the image taken by the left-side camera 15L. In the combined image, the discontinuous brightness and color at the border does not occur in the area behind the movable body 16 on which the driver pays more attention but may occur at the border between the image taken by the front camera 13 and the image taken by the right-side camera 15R, i.e., in the area in front of the movable body 16 on which the driver pays less attention.

Since the imaging setting changing apparatus 12 according to the present embodiment, as described above, determines the priorities based on the control information of the movable body 16, in the areas in the combined image on which the driver pays attention based on a variety states of the movable body 16, the probability to generate the border with discontinuous brightness and color is reduced, and the visibility of the combined image may be improved.

(Exemplary Variation)

Next, an imaging setting changing apparatus and an imaging system according to an exemplary variation of the above embodiment will be described. Although an imaging system 100 according to the exemplary variation has a configuration similar to that of the above embodiment, the imaging apparatus 10 and the imaging setting changing apparatus 12 operate in slightly different manners.

The imaging apparatus 10, similarly to the above embodiment, includes a plurality of imaging units: for example, the front camera 13, the rear camera 14, and the side cameras 15 (the left-side camera 15L and the right-side camera 15R).

In the exemplary variation, the camera controller 21a of the front camera 13 further outputs, via the in-vehicle network or a dedicated line, information on the gain to be multiplied by the image signal during the gain control, the gamma correction, and the white balance. The camera controllers 21b, 21c, and 21d have the same functions as the camera controller 21a.

The imaging setting changing apparatus 12, similarly to the above embodiment, includes the image acquisition unit 23, the control information acquisition unit 24, and the controller 25.

In the exemplary variation, the image acquisition unit 23 further acquires the information on the gain from the imaging units 13, 14, 15L, and 15R.

The controller 25 compares the information on the gain acquired from two imaging units (13, 14, 15L, and 15R) for commonly imaging the overlapping areas (FLA, FRA, ReLA, and ReRA) in the plurality of images taken by the imaging units 13, 14, 15L, and 15R.

Subsequently, the controller 25 warns the driver when the difference between the gains in the two information is at the predetermined threshold or greater. The warning may be, for example, displayed in the display apparatus 11. However, the warning is not limited to that manner but may be given by any means such as sound or vibration. When the warning is displayed, a target area in the combined image displayed in the display apparatus 11 may be displayed in a mode different from a normal mode. The target area may be, for example, an area using at least one of the images taken by the two imaging units (13, 14, 15L, and 15R) in the combined image or the overlapping areas (FLA, FRA, ReLA, and ReRA). Also, the warning in the different mode may be emphasis such as blinking or displaying a symbol in an overlapping manner. When the warning is given by the sound, the warning may indicate a direction of the target area viewed from the movable body 16.

Subsequently, the controller 25, when the difference between the gains in these information is at the predetermined threshold or greater, changes gain setting of at least one of the two imaging units (13, 14, 15L, and 15R) in such a manner as to reduce the difference.

Subsequently, the controller 25, similarly to the above embodiment, changes the imaging setting of at least one of the two imaging units (13, 14, 15L, and 15R) in such a manner as to reduce at least one of the brightness difference and the color difference of the images of the overlapping areas (FLA, FRA, ReLA, and ReRA) in the images taken by the two imaging units (13, 14, 15L, and 15R).

Also, the controller 25, similarly to the above embodiment, based on the control information acquired by the control information acquisition unit 24, determines the priorities of the overlapping areas FLA, FRA, ReLA, and ReRA. Then, the controller 25, from the overlapping area with a higher priority, carries out the above operation to the two images commonly capturing the overlapping areas FLA, FRA, ReLA, and ReRA and sequentially changes the gain setting and the imaging setting of the imaging units 13, 14, 15L, and 15R.

For example, the controller 25, when the control information includes information indicative of that the traveling direction is backward, determines that the movable body 16 is traveling backward. In this case, the controller 25 determines the priorities of the overlapping areas ReLA and RERA as "1" and the priority of the overlapping are FLA as "2". In accordance with such priorities, first, the gain setting and the imaging setting of the rear camera 14 and the side cameras 15L and 15R for imaging the overlapping areas ReLA and ReRA are changed. Next, the gain setting and the imaging setting of the front camera 13 for imaging the overlapping area FLA is changed.

When the movable body 16 travels backward, the driver of the movable body 16 is believed to pay attention on the area behind the movable body 16 in the combined image, i.e., the image taken by the rear camera 14. By determining the priorities as described above, the controller 25 changes the gain setting of the side cameras 15L and 15R in such a manner as to match the gains of the side cameras 15L and 15R to the gain of the rear camera 14. Subsequently, the controller 25 changes the imaging setting of the side cameras 15L and 15R in such a manner as to match the brightness and the color of the images taken by the side cameras 15L and 15R to those of the image taken by the rear camera 14. Next, the controller 25 changes the gain setting of the side cameras 15L and 15R in such a manner as to match the gain of the front camera 13 to that of the left-side camera 15L. Then, the controller 25 changes the imaging setting of the front camera 13 in such a manner as to match the brightness and the color of the image taken by the front camera 13 to those of the image taken by the left-side camera 15L. Thereby, the brightness and the color of the image taken by the rear camera 14, on which the driver pays attention, and the brightness and the color of the image taken by the side cameras 15L and 15R and the front camera 13 are adjusted to be recognized as equal.

Figure 5:
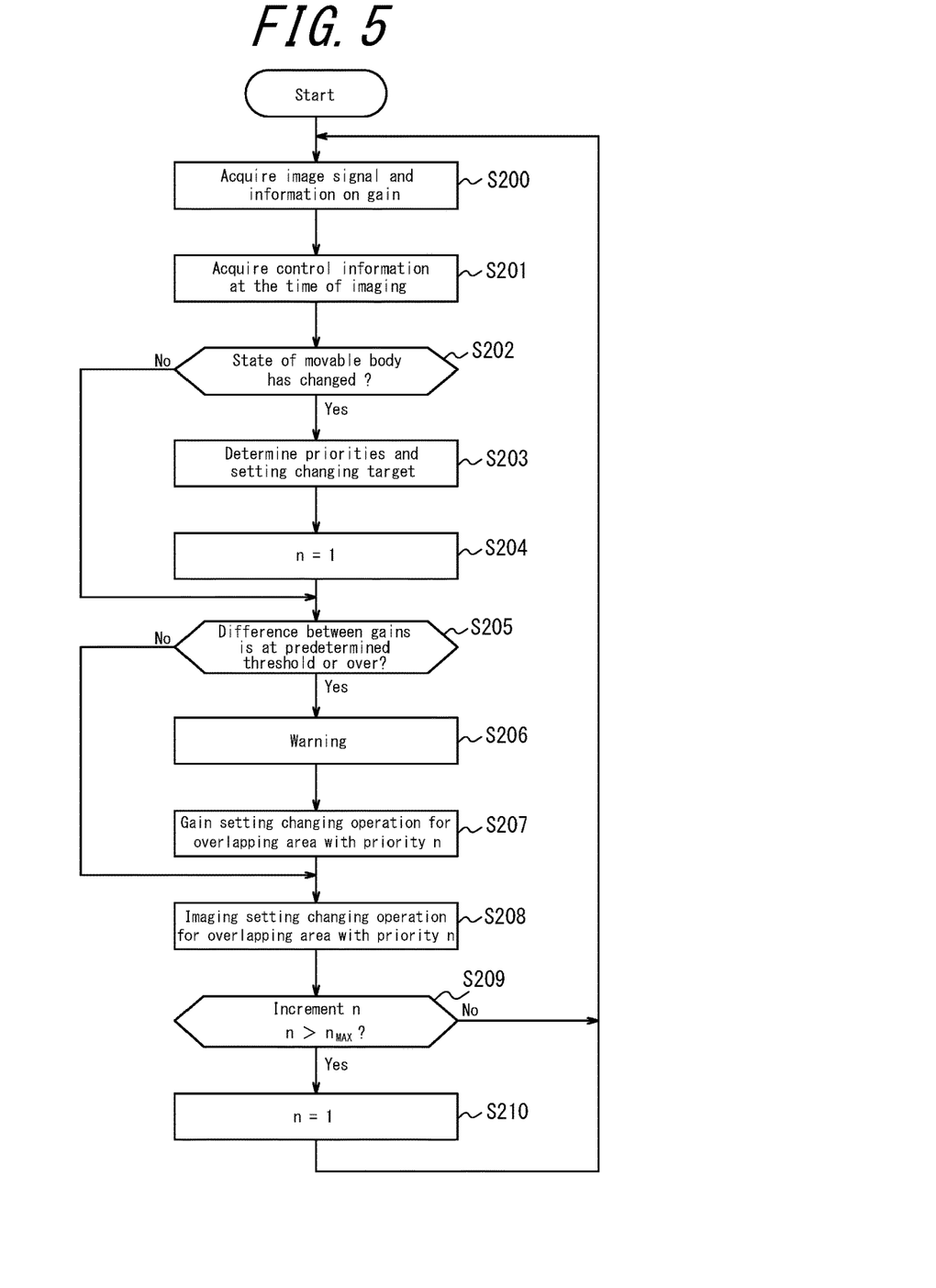
FIG. 5 is a flowchart illustrating an operation of an imaging setting changing apparatus according to an exemplary variation of the embodiment.

Next, an operation carried out by the imaging setting changing apparatus 12 according to the exemplary variation will be described with reference to a flowchart in FIG. 5. This operation, for example, starts at the time of startup of the imaging apparatus 10 and is carried out iteratively until the user's termination instruction.

First, in step S200, the controller 25 controls the image acquisition unit 23 to acquire the captured images as the image signals from the imaging units 13, 14, 15L, and 15R and also to acquire the information on the gains.

Subsequently, the imaging setting changing apparatus 12 carries out processing at step S201 to S204. Since the processing at step S201 to S204 are the same as those of step S101 to S104 in FIG. 4, descriptions thereof will be omitted.

After step S204, or at step S202 when the controller 25 determines that the state of the movable body 16 has not changed (No at step S202), the controller 25, based on the priorities determined at step S203, compares the information on the gains acquired from two imaging units (13, 14, 15L, and 15R) for commonly imaging the overlapping areas (FLA, FRA, ReLA, and ReRA). In particular, the controller 25 compares the information on the gains acquired from the two imaging units (13, 14, 15L, and 15R) for commonly imaging the overlapping areas (FLA, FRA, ReLA, and ReRA) with the priority value n. In step S205, the controller 25 determines whether the difference between the gains of these information is at the predetermined threshold or greater. When the difference between the gains is smaller than the predetermined threshold (No at step S205), the controller 25 proceeds to step S208.

On the other hand, when the difference between the gains is at the predetermined threshold or greater (Yes at step S205), in step S206, the controller 25 warns the driver.

Subsequently, in step S207, the controller 25, based on the priorities determined at step S203, changes the gain setting of the imaging units 13, 14, 15L, and 15R. In particular, the controller 25 changes the gain setting of at least one of the two imaging units (13, 14, 15L, and 15R) in such a manner as to reduce the difference between the gains of the two imaging units (13, 14, 15L, and 15R) for commonly imaging the overlapping areas (FLA, FRA, ReLA, and ReRA) with the priority value n.

After step S207, or when at step S205 the difference between the gains is smaller than the predetermined threshold (No at S205), the imaging setting changing apparatus 12 carries out processing at step S208 to S210. Since the processing at step S208 to S210 are the same as those of step S105 to S107 in FIG. 4, descriptions thereof will be omitted.

As described above, the imaging setting changing apparatus 12 according to the exemplary variation, when the difference between the gains of the two imaging units (13, 14, 15L, and 15R) is at the predetermined threshold or greater, carries out at least one of warning the driver and changing the gain setting of at least one of the two imaging units (13, 14, 15L, and 15R) in such a manner as to reduce the difference between the gains. Subsequently, the imaging setting changing apparatus 12 changes the imaging setting of at least one of the two imaging units (13, 14, 15L, and 15R) in such a manner as to reduce at least one of the brightness difference and the color difference of the two images.

When the gains of the two imaging units (13, 14, 15L, and 15R) greatly differ from each other, the visibilities of the images taken by the two imaging units also greatly differ from each other, possibly rendering a subject such as a visible obstacle in one of the captured images difficult to be viewed in the other captured image. In this case, the imaging setting changing apparatus 12 according to the exemplary variation may warn the driver about the probability that there is a subject with low visibility in the combined image displayed in the display apparatus 11. Further, since the gain setting of the two imaging units (13, 14, 15L, and 15R) is changed first and then the imaging setting is changed, operation time and an operation load for changing the imaging setting may be reduced.

Although the disclosure herein has been described based on the figures and the embodiment, it is to be understood that various modifications and changes may be implemented based on the disclosure by those who are ordinarily skilled in the art. Accordingly, such modifications and changes are included in the scope of the present disclosure.

For example, although in the above embodiment the imaging apparatus 10 includes the front camera 13, the rear camera 14, and the side cameras 15L and 15R, the imaging apparatus 10 may have more imaging units (cameras). For example, the imaging apparatus 10 may further include a distant view camera capable of imaging the entire periphery of the movable body 16.

Also, each component of the imaging system 100 of the above embodiment may be separated or rearranged. For example, the imaging setting changing apparatus 12 may include the imaging units (13, 14, 15L, and 15R). Also, for example, the imaging system 100 may further include a navigation system that includes the imaging setting changing apparatus 12.

Also, when the imaging setting changing apparatus 12 of the above embodiment changes the imaging setting of the imaging units 13, 14, 15L, and 15R, the imaging setting changing apparatus 12 may change the setting by overwriting or modifying.

In the above embodiment, further, although the imaging setting changing apparatus 12, when the movable body 16 is traveling forward with the headlights on at night, changes the imaging setting of the front camera 13 to match to the images taken by the side cameras 15L and 15R, the imaging setting changing apparatus 12 may change the imaging setting of the side cameras 15L and 15R and the front camera 13. For example, the controller 25 changes the imaging setting of the front camera 13 in such a manner as to increase the brightness of the image taken by the front camera 13 and, also, changes the imaging setting of the side cameras 15L and 15R in such a manner as to reduce the brightness of the images taken by the side cameras 15L and 15R. Thereby, the area illuminated by the headlights in the image taken by the front camera 13 may be prevented from being overexposed and, simultaneously, the brightness difference and the color difference of the overlapping areas FLA and FRA in the images taken by the side cameras 15L and 15R and the front camera 13 are reduced.

REFERENCE SIGNS LIST

- 10 imaging apparatus
- 11 display apparatus
- 12 imaging setting changing apparatus
- 13 front camera
- 14 rear camera
- 15, 15L, 15R side camera
- 16 movable body
- 17 side mirror
- 18a, 18b, 18c, 18d optical system
- 19a, 19b, 19c, 19d imager
- 20a, 20b, 20c, 20d image processing unit
- 21a, 21b, 21c, 21d camera controller
- 22 image combining apparatus
- 23 image acquisition unit
- 24 control information acquisition unit
- 25 controller
- 100 imaging system
- 101 in-vehicle network

The invention claimed is:

1. An imaging setting changing apparatus comprising:
   an image acquisition unit configured to acquire a plurality of images capturing around a movable body in a partially overlapping manner generated by a plurality of imaging units; and
   a controller configured to
   determine priority values of each overlapping areas of the plurality of images,
   change imaging setting of at least one of two imaging units configured to commonly image an overlapping area in such a manner as to reduce at least one of a brightness difference and a color difference of images of the overlapping area taken by the two imaging units based on the priority values,
   wherein the imaging setting includes at least one of setting of an aperture or a shutter speed and information on a gain to be multiplied by an image signal during a gain control, a gamma correction, or a white balance of the at least one of two imaging units, and
   wherein the change of the imaging setting occurs after the image acquisition unit acquires the plurality of images.

2. The imaging setting changing apparatus according to claim 1, further comprising a control information acquisition unit configured to acquire control information of the movable body, wherein the controller determines the priority values based on the control information.

3. The imaging setting changing apparatus according to claim 2, wherein
   the control information includes at least one of time information, information on a traveling direction of the movable body, information on a steering angle of the movable body, information on an illumination state of the movable body, and information on a speed of the movable body.

4. The imaging setting changing apparatus according to claim 1, wherein
   the image acquisition unit acquires information on a gain from each of the plurality of imaging units, and
   the controller, when a difference between gains of two imaging units according to the information is at a predetermined threshold or greater, carries out at least one of warning a driver and changing gain setting of at least one of the two imaging units in such a manner as to reduce the difference between the gains before changing the imaging setting.

5. An imaging system comprising:
   a plurality of imaging units configured to generate a plurality of images capturing around a movable body in a partially overlapping manner;
   an image acquisition unit configured to acquire the plurality of images; and
   a controller configured to
   determine priority values of each overlapping areas of the plurality of images,
   change imaging setting of at least one of two imaging units configured to commonly image an overlapping area in such a manner as to reduce at least one of a brightness difference and a color difference of images of the overlapping area taken by the two imaging units based on the priority values,
   wherein the imaging setting includes at least one of setting of an aperture or a shutter speed and information on a gain to be multiplied by an image signal during a gain control, a gamma correction, or a white balance of the at least one of two imaging units, and
   wherein the change of the imaging setting occurs after the image acquisition unit acquires the plurality of images.

6. An imaging setting changing method carried out by an imaging setting changing apparatus, the method comprising:
   acquiring a plurality of images capturing around a movable body in a partially overlapping manner generated by a plurality of imaging units;
   determining priority values of each overlapping areas of the plurality of images; and
   changing imaging setting of at least one of two imaging units configured to commonly image an overlapping area in such a manner as to reduce at least one of a brightness difference and a color difference of images of the overlapping area taken by the two imaging units based on the priority values,
   wherein the imaging setting includes at least one of setting of an aperture or a shutter speed and information on a gain to be multiplied by an image signal during a gain control, a gamma correction, or a white balance of the at least one of two imaging units, and wherein the changing of the imaging setting occurs after the image acquisition unit acquires the plurality of images.

* * * * *